United States Patent [19]

Doi

[11] Patent Number: 4,472,740
[45] Date of Patent: Sep. 18, 1984

[54] TELEVISION CAMERA SYSTEM

[75] Inventor: Yoshikazu Doi, Saitama, Japan

[73] Assignee: Fuji Photo Optical Co., Ltd., Saitama, Japan

[21] Appl. No.: 411,822

[22] Filed: Aug. 26, 1982

[30] Foreign Application Priority Data

Aug. 26, 1981 [JP] Japan .................. 56-133585

[51] Int. Cl.³ .............................................. H04N 9/04
[52] U.S. Cl. ....................... 358/209; 358/55; 358/225
[58] Field of Search ................. 358/41, 50, 51, 55, 358/214, 209, 225, 226

[56] References Cited

U.S. PATENT DOCUMENTS

| 4,158,208 | 6/1979 | Dischert | 358/10 |
| 4,167,022 | 9/1979 | Dischert et al. | 358/41 |
| 4,170,024 | 10/1979 | Dischert | 358/41 |
| 4,183,044 | 1/1980 | Breithaupt | 358/17 |
| 4,427,996 | 1/1984 | Tamura | 358/228 |

FOREIGN PATENT DOCUMENTS 56-1832  1/1982  Japan .

Primary Examiner—G. Z. Rubinson
Assistant Examiner—Robert Lev
Attorney, Agent, or Firm—Young & Thompson

[57] ABSTRACT

A television camera system using any television lens and camera in combination achieves automatic video control. The television camera actually used in the television camera system has an erasable memory having memorized therein optical and/or electrical regulation values of the television camera with respect to a standardized television lens for forming the best images or the intended images. Similarly, the television lens actually used in the television camera system has an erasable memory having memorized therein optical and/or electric regulation values of the television camera with respect to a standardized television camera for forming the best images or the intended images. The regulation values read out from these memories are used to control the amount of regulation of the camera control unit.

5 Claims, 3 Drawing Figures

TELEVISION CAMERA SYSTEM

BACKGROUND OF THE INVENTION

This invention relates to television camera systems, and more particularly to television camera systems in which video control automatically takes place upon mounting an interchangeable television lens on a television camera.

In general, television camera systems comprise a television lens and a television camera including video control means for processing video signals into which primary color components (R, G and B) of the image formed by the television lens are converted and deflection control means for generating vertical and horizontal scan signals. The video control means has a color balance regulation system (video control system), while the deflection control means has a registration regulation system (deflection control system); and such control systems are united as a camera control unit (CCU) for centralized control in order to adjust the television camera system so as to form best video images.

The CCU regulates the sensitivity of camera tubes as to R, G and B component color balance, parabolic shading, saw shading and registration (centering in horizontal and vertical directions) in registration regulation systems. The degree of regulation of the respective parameters is determined by controlling the gradient, the gain or the like of a scanning signal or video signal by a respectively associated variable resistor provided in the CCU. On the other hand, television lenses differ from each other according to their optical construction, either as to optical characteristics such as tracking, chromatic aberration, distortion, curvature aberration, astigmatism, spherical aberration, spectral transmission factor, distribution of light over an image surface and the like, or as to dynamic optical characteristics variable in dependence on zoom, iris position and focus setting, such as registration, distortion, shading, axial aberration and color balance.

When any type of television lens having different optical characteristics is mounted on a television camera, it is known in the art to provide a manual fine adjustment of the CCU to regulate electrically the optical characteristics of the television lens to be used so as to form the best image at all times, while at the same time monitoring the image by the television camera system. Furthermore, it is known to provide a fine adjustment of the CCU so as to form intentionally corrected images according to operator's aims, for instance to form intentionally an image with vignetted scenes. If the optical characteristics mentioned above are uniform between different types of television lenses, the fine adjustment of the CCU may be provided only for correcting variations of the optical characteristics of the television camera caused by television camera system operating conditions such as temperature changes or changes in the electric characteristics of the television camera with the passage of time, or the like.

However, standardizing the optical characteristics of different television lenses is hardly possible because of their extremely complicated construction and great bulk. Therefore, the adjustment of the CCU requires a great deal of skill, especially as to the dynamic optical characteristics, since it should be carried out for every variation of conditions during zooming, iris positioning and focusing, which is obviously difficult to do with speed and precision.

An important improvement in the foregoing television camera system is described, for instance, in Japanese patent publication No. 56-1832. The improved technique disclosed therein eliminates the disadvantage that, when television lenses having different optical characteristics are mounted on a television camera, in combination with a standard television lens having suitable optical characteristics, the added lens has to be adjusted while at the same time, video monitoring is needed. The added television lens in that Japanese patent can be used under optimum conditions by controlling the electric processing system of the CCU with electric parameters representing the deviation of the added television lens from the standard television lens upon mounting it on the television camera. However, there is the further disadvantage in the television camera system just described, that it is impossible to control automatically the CCU according to changes that take place with the passage of time, for instance deviations in lens position caused by wearing of a cam mechanism for axially displacing optical lens elements, and also according to changes in the dynamic optical characteristics.

OBJECTS OF THE INVENTION

An object of the present invention is to provide a television camera system suitable for automatic video control using any combination of various television lenses and cameras.

Another object of the present invention is to provide a television camera system capable of compensating for changes in the television lens and camera that take place with the passage of time.

Still another object of the present invention is to provide a television camera system wherein changes in image quality in dependence on the dynamic optical characteristics of the television lens in use can be avoided.

Finally, it is an object of the present invention to provide a television camera system wherein various television lens can be exchanged to produce the intended images and without the provision of fine adjustment, according to the operating conditions.

SUMMARY OF THE INVENTION

The above objects are achieved by providing two erasable memory means: one for the television lens that is used, having memorized therein the amount of regulation needed, of the optical and/or electric characteristics thereof based on a television camera system comprising the lens that is used and a standard camera, so as to form the best images or the desired images, the other memory means for the television camera that is used, having memorized therein the amount of regulation needed, of the optical and electric characteristics thereof based on a television camera system comprising a standard lens, so as to form the best images or the desired images. Both amounts of adjustment of the optical and/or electric characteristics, memorized in the memories of the practical television lens and the camera, are used in combination to control automatically video signals, thereby allowing the best or the desired images to be formed.

The above-mentioned amount of regulation (called "deviation value" hereinafter) memorized in the memory means is read out by addressing means according to variations of zoom, iris position setting and the like so as automatically to adjust the television system which is used, to the most suitable conditions even as to their dynamic optical characteristics. Furthermore, by employing a PROM, allowing new data to be written thereinto, as the memory means, the television camera system according to the present invention becomes more useful and operationally superior because those new data of deviation value, which vary in dependence on changes of the television system with the passage of time, are easily written and automatically re-adjusts the television camera system thereby. The television camera system does not require the provision of means or devices for measuring deviation values thereof because the deviation values are measured to be written in the memory means located either on television lenses and-/or on television cameras, at the manufacturer's plant. Thus, this television camera system, which can be automatically adjusted so as to have the most suitable characteristics, eliminates the need for a great deal of skill on the part of operators, and is economical and efficient.

DETAILED DESCRIPTION OF THE INVENTION

In general, it is known in television camera systems to provide adjustment means so as to form the best images. The parameters to be controlled for this adjustment are changes in illumination conditions and in the characteristics of the television lenses and cameras. Adjustment of television camera systems according to changed illumination conditions has been achieved by illuminating a test pattern under a known illumination, forming an image of this test pattern through the television lens and camera on a monitor, and readjusting the CCU while monitoring the thus-formed image (such an adjusting technique is disclosed in, for instance, NHK Gijutsu Geppo, 16: No. 6, 1967 "Computer Control for Color Camera"). Such being the case, a standardized illumination condition will be assumed in the following description.

Figure 1:
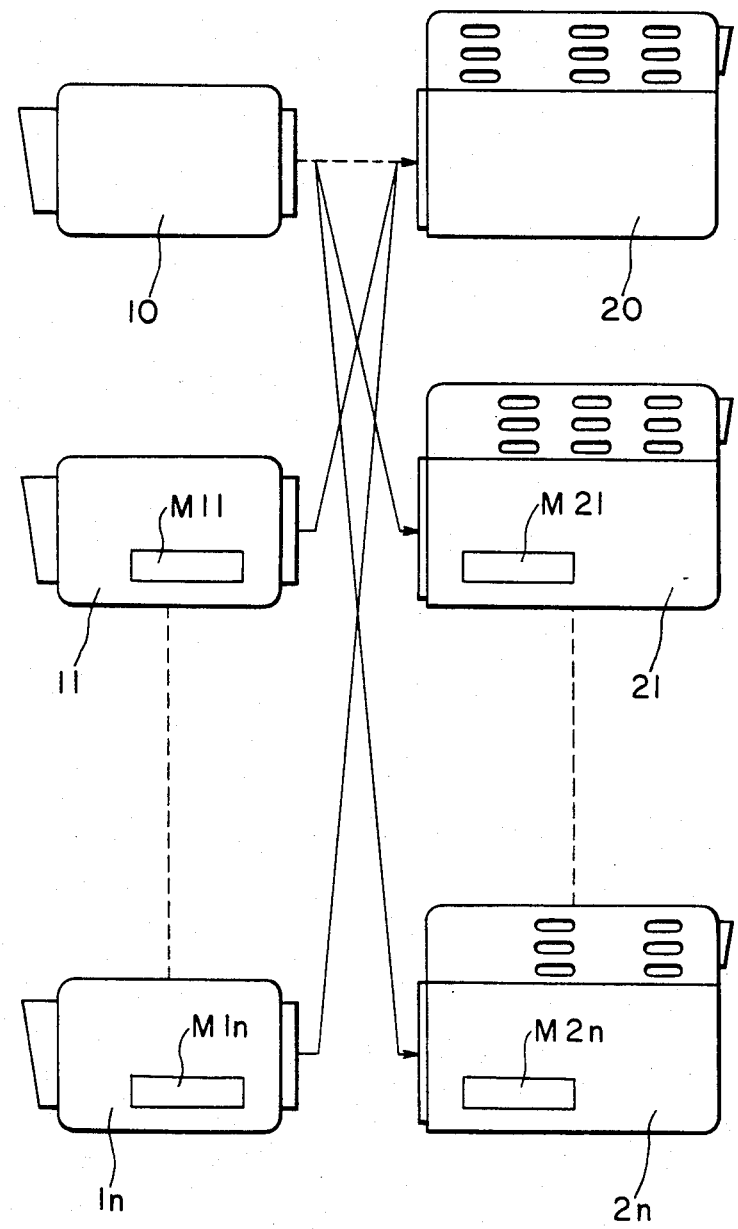
FIG. 1 is a schematic illustration showing a television camera system according to the present invention.

Referring now to FIG. 1 schematically illustrating television camera systems according to the present invention, a combination of a standardized lens 10 and a standardized camera 20 is taken as a model of a television camera system for forming the best images of an object under standardized illumination conditions. In order to adjust the television camera system which is actually used, and which comprises any one of the combinations of lenses 11 to 1n actually used, and cameras 21 to 2n actually used, to the characteristics of the model 10, 20, it is necessary to control the CCU which is separately provided or located on the cameras 21 to 2n actually used, in accordance with every possible combination. Therefore, by comparing the characteristics of the respective television camera system actually used, with the specified or standardized characteristics of the model system, correlation between the television lens and camera actually used in every combination can be quantitatively determined to establish a quantitative deviation value (and hence the amount of required regulation) of the television camera system actually used, from the model.

To explain this procedure in greater detail:

The quantitative deviation value of the actually-used camera 2n in combination with the standardized lens 10, from the model system, is memorized in the memory means M2n. Also, the quantitative deviation value of the actually-used lens 1n in combination with the standardized camera 20, from the model system, is memorized in the memory means M1n. With these deviation values as control signals, video signals or deflection signal generated by the actually-used television camera system 1n–2n are processed so as to form images having a close resemblance to the best images obtainable with the model system. Of course such control signals are not only inherent in the lenses or cameras but also are changeable in dependence on variations of focus, zoom and iris position of the lens. Furthermore, when it is desired to vary the control signals for the purpose of modifying the images to be formed according to operator's intentions, this is easily carried out by manually or otherwise intentionally varying the memorized deviation values in the actually-used television lens and/or camera. Although in the above description, the information memorized in the respective actually-used lenses 11 to 1n and cameras 21 to 2n is defined as values of deviation from the characteristics of the standardized lens and camera 10 and 20, respectively, the information to be memorized in the actually-used lens may be an absolute value (for instance the spectral transmittance factor per se). In this case, the absolute value is read in the memory means of the actually-used camera to determine the deviation value, thereby to adjust the actually-used television camera system.

Figure 2:
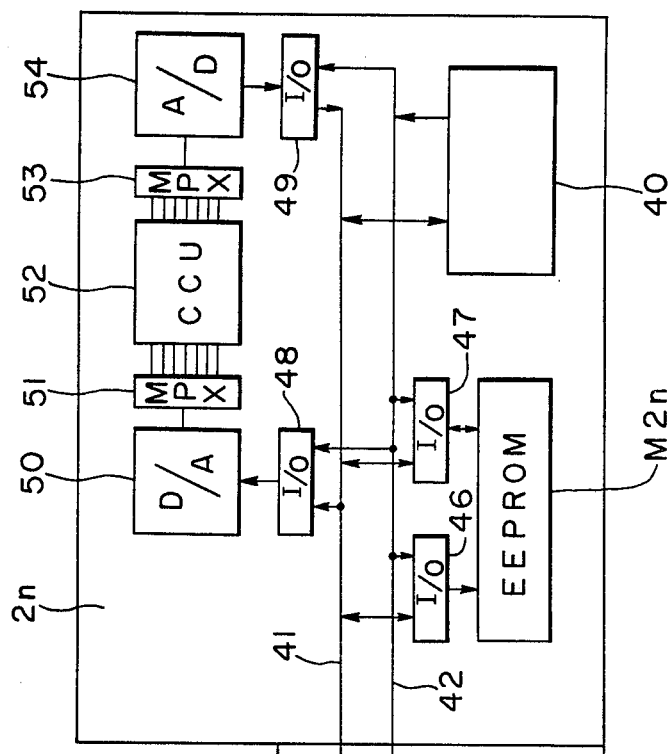
FIG. 2 is a schematic block diagram showing a circuit of a television camera system embodying the present invention.

FIG. 2 shows an overall diagram of a circuit of a television camera system comprising an actually-used television lens 1n and camera 2n in combination, like reference numerals in FIG. 2 being used to denote the same elements as shown in FIG. 1. The deviation values in the form of digital values of the actually-used lens 1n from the standardized camera 20 for controlling both the registration regulation system and the color balance regulation system of the CCU 52 are memorized in the memory means M1n thereof, said CCU 52 being controlled in dependence on the inherent characteristics of the actually-used lens 1n, for instance tracking, chromatic aberration, spectral transmittance, and also in dependence on the dynamic optical characteristics such as registration, distortion, shading, axial aberration and color balance, each in dependence on variations of zoom, iris position and focus setting and quantity of light on the image surface. In this embodiment, the electrically erasable and programmable ROM (EEPROM) is employed as a memory means. There is additionally provided an addressing means 30 for generating data signals, which addresses locations of the EEPROM M1n to read out control signals therefrom, and uses said control signals to control the CCU in dependence on variations of at least one of the parameters comprising zoom, iris position and focus setting of the actually-used lens.

Figure 3:
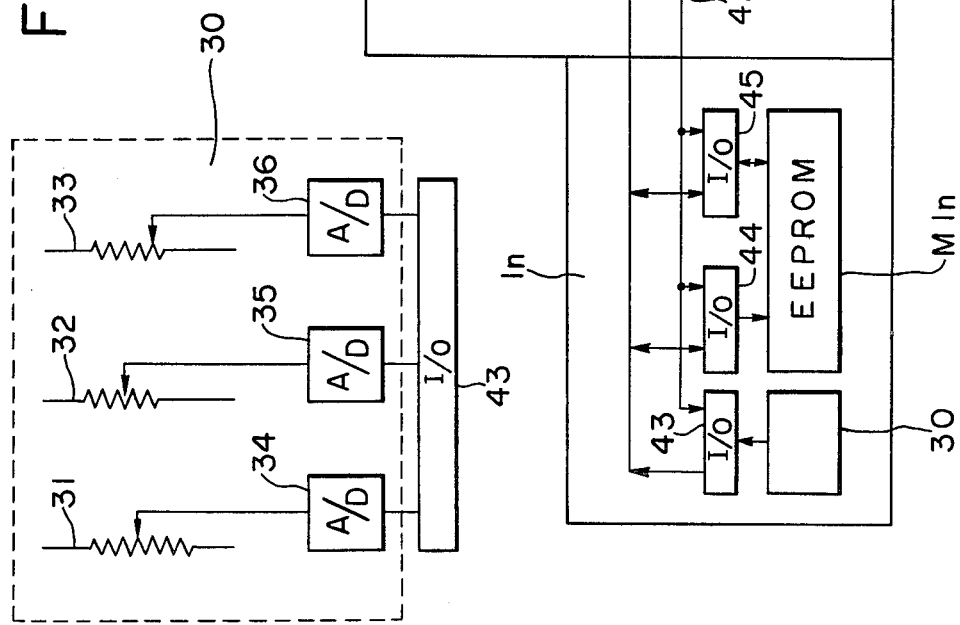
FIG. 3 is a schematic illustration of an addressing means in the circuit shown in FIG. 2.

In FIG. 3 showing an embodiment of the addressing means 30, in which the addressing signals in accordance with the variation of zoom setting are provided as digital values into which the voltage determined by means of a variable resistor 31 associated with the zooming operation is converted by an A-D converter 34, the addressing signals in accordance with the variation of iris position setting are provided as digital values into which the voltage determined by means of variable resistor 32 associated with the iris positioning operation is converted by an A–D converter 35, and the addressing signals in accordance with the variation of focus setting are provided as digital values into which the voltage determined by means of variable resistor 33 associated with the focusing operation is converted by an A–D converter 36.

Referring again to FIG. 2, in the memory means M2n or EEPROM of the actually-used television camera 2n, the deviation values of the actually-used television camera 2n in combination with the standardized television lens 10 from the standardized television camera 20 for controlling the registration regulation system and the color balance regulation system of the CCU 52 are memorized in the form of digital values. The actually-used television camera 2n is further provided with a control computer 40 which serves to sequentially output, after operation, the respective deviation values in the memory means M1n and M2n in accordance with the addressing signals from the addressing means 30 to a D–A converter 50 to be described later. These circuits are associated with one another through a data bus line 41, an address bus line 42 and a control line (not shown). The output on the data bus line 11 is converted into analog values by the D–A converter 50 thereby to control sequentially the regulation parameters of the registration regulation system and the color balance regulation system of the CCU 52 through a multiplexer (MPX) 51 (for instance the control parameters are controlled by using said analog values with the voltages provided by the variable resistors added).

Control signals representing the amount of re-regulation in accordance with varying operation conditions and/or image forming aims for controlling the CCU are sequentially output to the data bus line 41 through a multiplexer 53 after conversion into digital values by an A–D converter 54.

In the description hereinbefore, inputs to the bus lines from the associated circuits and outputs from the former to the latter are supplied through the respective input-output ports 43 to 49 which are so controlled by the control computer 40 as to memorize temporarily said inputs and outputs on the bus line 41 and 42. The input-output ports 44 and 46 serve to control writing and erasing of the EEPROM's M1n and M2n.

By using optical fiber cables or photo couplers in place of the bus lines, signals can be transmitted without electric noise, and connections between the circuits are conveniently effected.

The television camera system having the construction described above operates as follows:

First of all, upon mounting the actually-used television lens 1n on the actually-used television camera 2n, the respective bus lines 41 and 42 are automatically connected. After the completion of this mounting operation, the control computer 40 reads in the address information from the addressing means 30, giving the address of each EEPROM to be read out through the input-output ports 41 and 46, respectively. At this time, from the address of the EEPROM M1n, the respective deviation values of the actually-used television lens 1n from the standardized television camera 20 for controlling the CCU 52 which are memorized according to the variations of zoom, iris position and focus setting thereof are transmitted to the input-output port 45. On the other hand, from the EEPROM M2n, the respective deviation values of the actually-used television camera 2n from the standardized television lens 10 for controlling the CCU 52 which are memorized according to the variations of zoom, iris position and focus setting thereof are transmitted to the input-output port 47. It is to be noted that the computer 40 sequentially reads out the values in the respective input-output ports 45 and 47 and then operates the values read out. After the operation, the results are temporarily memorized in the input-output port 45. These operation results, which are the deviation values of the actually-used television lens 1n and camera 2n from the standardized television camera 20 and lens 10, respectively, are added to define the deviation values of the actually-used television camera system from the standardized television camera system.

The added deviation values representing the amount of regulation required, are converted into analog values by a D–A converter 50 and then sequentially transmitted to the CCU 52 through a multiplexer 51 so as to control the CCU 52 for the regulation of, for instance, parabolic shading, saw shading, registration, and the sensitivity of the camera to the primary colors R, G and B. As a result of this, the actually-used television camera system is automatically adjusted to form images having a close resemblance to those formed by the model system.

When the CCU 52 is re-adjusted in dependence on the operation conditions, changes with the passage of time, and image-forming aims, the deviation values thus re-adjusted are sequentially converted into digital values by the multiplexer 53 and the converter 54 and then transmitted to the input-output port 49.

Thus when a different television lens is to be used under the same operating conditions and image-forming aims as previously, the control computer 40 is caused to execute a program so as to write the deviation values transmitted to the input-output port 49 into the EEPROM M2n in the actually-used television camera 2n, while erasing the deviation values previously written in the EEPROM M2n. On the other hand, in the case of actually using a different camera, the control computer 40 is caused to execute a program so as to write the deviation values transmitted to the input-output port 49 into the EEPROM M1n in the actually-used television lens.

However, when said re-adjustment of the CCU 52 is temporary, it is enough to maintain the computer stopped so as to hold the deviation values written in the EEPROM M1n or M2n.

Although the CCU 52 and the control computer 40 are in their embodiment disclosed to be located on the actually-used cameras, it is preferable to provide them separate from the cameras so as to be usable interchangeably in various actually-used television cameras. In this case, a UVEPROM (ultraviolet light erasable and electrically programmable ROM) can be used as a memory means so as to be detachably mounted on an actually-used television lens or camera after writing the deviation information into it with a ROM-writer.

It is further possible to use magnetic tape or magnetic cards as the memory means in the actually-used television lenses. The deviation value memorized on the magnetic tape or card is automatically read out therefrom to be written in the memory means in a television camera upon mounting the respective television lens thereon.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A television camera system adapted to use interchangeable television cameras and lenses in any combination, which comprises:
   a television camera having erasable memory means having memorized therein optical and/or electric control values by which the television camera is, when used in combination with a standardized television lens having optimum optical characteristics, adjusted so as to form the best or the intended images; and
   a television lens having erasable memory means having memorized therein optical and/or electric control values by which the television camera is, when used in combination with a standardized television camera having optimum optical and electric characteristics, adjusted so as to form the best or the intended images.

2. A television camera system as defined in claim 1, wherein said optical and/or electric control values memorized in the memory means are the amounts of deviation from standardized values.

3. A television camera system as defined in claim 2, wherein said erasable memory means is an ultraviolet light erasable and electrically programmable read only memory (UVEPROM) or an electrically erasable and programmable read only memory (EEPROM).

4. A television camera system as defined in claim 3, which further comprises means for giving the address of the memory to be read out in dependence on variations of zoom, iris position and focus setting.

5. A television camera system as defined in claim 4, wherein said addressing means comprises variable resistors whose resistance varies with movements of optical elements of the television lens, and A-D converters for converting voltages output from said variable resistors into digital signals.

* * * * *